United States Patent
Ryu et al.

(10) Patent No.: US 7,105,819 B2
(45) Date of Patent: Sep. 12, 2006

(54) INFRARED RAY SENSOR USING SILICON OXIDE FILM AS INFRARED RAY ABSORPTION LAYER AND METHOD OF FABRICATING THE SAME

(75) Inventors: Sang Ouk Ryu, Daejeon-Shi (KR); Seong Mok Cho, Daejeon-Shi (KR); Kwi Dong Kim, Daeeon-Shi (KR); Byoung Gon Yu, Daejon-Shi (KR)

(73) Assignee: Electronics and Telecommunications Research Institute, Daejeon-Shi (KR)

( * ) Notice: Subject to any disclaimer, the term of this patent is extended or adjusted under 35 U.S.C. 154(b) by 297 days.

(21) Appl. No.: 10/788,340

(22) Filed: Mar. 1, 2004

(65) Prior Publication Data
US 2004/0256559 A1 Dec. 23, 2004

(30) Foreign Application Priority Data
Jun. 19, 2003 (KR) ............... 10-2003-0039661

(51) Int. Cl.
*G01J 5/00* (2006.01)
(52) U.S. Cl. .................................. 250/338.3
(58) Field of Classification Search ............. 250/338.3, 250/338.1, 336.1
See application file for complete search history.

(56) References Cited

U.S. PATENT DOCUMENTS

| | | | |
|---|---|---|---|
| 5,523,564 A * | 6/1996 | Yamada et al. ............ 250/338.1 |
| 5,949,071 A | 9/1999 | Ruffner et al. |
| 6,031,231 A | 2/2000 | Kimata et al. |
| 6,034,374 A * | 3/2000 | Kimura et al. .......... 250/370.08 |
| 6,087,661 A | 7/2000 | Owen et al. |
| 6,339,220 B1 | 1/2002 | Oda |
| 6,759,714 B1 * | 7/2004 | Kim et al. ................... 257/347 |
| 2002/0139933 A1 | 10/2002 | Iida et al. |
| 2003/0164450 A1 * | 9/2003 | Bruchhaus et al. ....... 250/338.4 |
| 2004/0214382 A1 * | 10/2004 | Park et al. ................... 438/197 |

FOREIGN PATENT DOCUMENTS

| | | | |
|---|---|---|---|
| JP | 01089106 A * | 4/1989 |
| JP | 08-178741 | 7/1996 |
| KR | 1020000046517 | 7/2000 |
| KR | 2002-0039670 | 5/2002 |

OTHER PUBLICATIONS

S. Bauer, et al.; "*Thin metal films as absorbers for infrared sensors*"; Sensors and Actuators; A. 37-38; 1993; pp. 497-501.

* cited by examiner

*Primary Examiner*—David Porta
*Assistant Examiner*—David S. Baker
(74) *Attorney, Agent, or Firm*—Mayer, Brown, Rowe and Maw LLP

(57) ABSTRACT

The present invention relates to a pyroelectric infrared ray sensor fabricated by using MEMS processes, wherein an infrared ray absorption layer disposed on the most top portion of the infrared ray sensor assembly is formed with a silicon oxide film ($SiO_2$) to exhibit an excellent absorption efficiency with respect to the infrared wavelength band of 8 to 12 mm and function as a protective film for a sensor pixel. In addition, an infrared ray absorption layer, support arms and posts are formed in a single body to allow the sensor assembly to be robust and fabricating processes to be remarkably reduced to increase a process yield.

15 Claims, 8 Drawing Sheets

INFRARED RAY SENSOR USING SILICON OXIDE FILM AS INFRARED RAY ABSORPTION LAYER AND METHOD OF FABRICATING THE SAME

BACKGROUND

1. Field of the Invention

The present invention relates to an infrared ray sensor and, more particularly, to an uncooled pyroelectric infrared ray sensor in which an infrared ray absorption layer of a focal plate is composed of a silicon oxide film, and the infrared ray absorption layer, support arms and posts are integrated in a single body, and a method of fabricating the same.

2. Discussion of Related Art

A focal plate of a pyroelectric infrared ray sensor is an element that converts an incident infrared energy into a thermal energy to transmit it to a pyroelectric thin film and detects the variation of charges generated in a pyroelectric material at the same time as an electrical signal. Typically, a focal plate of an infrared ray sensor includes several parts such as a part for converting an incident infrared ray into a thermal energy, a part of the functional material for exhibiting differences of the electrical characteristics in accordance with the amount of the thermal energy, and a part of the metallic wiring for detecting the electrical signals in accordance with the differences of the electrical characteristics.

If an infrared ray is incident to a pyroelectric infrared ray sensor, the corresponding energy is delivered to the focal plate to raise the temperature of a pyroelectric thin film, thus generating variations of residual surface charges, that is, the inherent characteristic of a pyroelectric material. The variation of the generated charges is detected through a metallic wiring as minute currents. At this point, the minute currents equal to or less than pico-amperes (~pA) are detected so that noise ratio of the element becomes an important factor for detecting the signals. For this reason, it is preferable that the focal plate including the pyroelectric thin film, the main component of the infrared ray sensor, has a configuration three-dimensionally separated from a substrate in order to avoid thermal noises.

FIG. 1 is a perspective view illustrating a conventional configuration of a pyroelectric infrared ray sensor, disclosed in the U.S. Pat. No. 6,087,661 entitled 'Thermal Isolation of Monolithic Thermal Detector', by Robert A. Owen et al. Such a pyroelectric infrared ray sensor has a configuration three-dimensionally separated from a substrate in consideration of thermal noises.

Referring to FIG. 1, a thermal sensor 36 mainly includes a thermal assembly 44 and a signal flow path 46. The thermal assembly 44 comprises a thermal sensing element 50 for generating a signal in accordance with thermal energy and a pair of electrodes 52 and 54 for collecting the signal generated by the thermal sensing element 50. The signal flow path 46 transmits the signal collected by the electrodes 52 and 54 to the substrate 34, and includes a pair of support arms 56 and 58 extending from each of electrodes 52 and 54 and connected to the substrate 34. The support arms 56 and 58 are supported by the posts 64 disposed on the contact pads 70 on the substrate 34 and support the thermal assembly 44 to be separated from the substrate 34. The support arms 56 and 58 are formed with a thermal insulating material, which provides electrical conductivity to transmit the signal collected by the electrodes 52 and 54 to the substrate 34.

The pyroelectric infrared ray sensor shown in FIG. 1 comprises not an infrared ray absorption layer but upper and lower electrodes 52 and 54 composed of an oxide film, which is transparent in an infrared wavelength band. For this reason, a part of the incident infrared ray is absorbed in the pyroelectric thin film and then absorbed again after reflected by a metallic thin film (not shown) formed on the surface of the substrate 34. In such a configuration, the upper and lower electrodes 52 and 54 of the focal plate assembly of the infrared ray sensor should be supported by two separate support arms 56 and 58.

Such a configuration is advantageously sensitive to the variation of the amount of the incident infrared ray by decreasing the thermal mass of the focal plate. However, the electrodes made of the thin oxide films should support the focal plate assembly. Therefore, such a configuration is structurally unstable, so that the process yield decreases. In addition, the top portion of the substrate must disadvantageously have a metallic thin film which functions as a reflecting mirror for reflecting the incident infrared ray from the substrate.

SUMMARY OF THE INVENTION

The present invention is contrived to solve the above problems and is directed to an infrared ray sensor capable of having a robust structure, reducing fabricating processes, and improving an infrared ray absorption capability in about 8 to 12 mm wavelength band by integrating an infrared ray absorption layer, support arms and posts in a single body using silicon oxide films, and a method of fabricating the same.

According to one preferred embodiment of the present invention, an infrared ray sensor comprises: a focal plate for detecting an incident infrared ray, in which a lower electrode, a pyroelectric thin film, an upper electrode and an infrared ray absorption layer are laminated; electrodes connected to the upper electrode and the lower electrode via wirings, respectively; and a support means for supporting the focal plate on a substrate, wherein the infrared ray absorption layer is composed of a silicon oxide film with a predetermined thickness.

According to another preferred embodiment of the present invention, a method of fabricating an infrared ray sensor, comprises the steps of: forming a protective film and a sacrificial layer on a substrate having a plurality of junctions and then patterning the sacrificial layer to expose the protective film formed on top portions of the junctions; forming a buffer layer on the whole top surface and then patterning the buffer layer and the protective film to form contact holes thereby exposing the junctions; forming plugs on the contact holes and a lower electrode connected to one of the plugs via a wiring on the buffer layer between the plugs; forming a pyroelectric thin film on the lower electrode; forming an upper electrode connected to the other plug via a wiring on the pyroelectric thin film; forming a silicon oxide film on the whole top surface and then patterning the silicon oxide film so that an infrared ray absorption layer is formed on the upper electrode, posts are formed by surrounding the plugs, and support arms are formed between the infrared ray absorption layer and the posts, respectively; and removing the sacrificial layer.

Here, the infrared ray absorption layer and the support means are composed of a silicon oxide film. The support means includes posts surrounding the electrode portions having a plug shape and connected to junctions formed on the substrate and support arms connecting the posts to the focal plate. The infrared ray absorption layer, the support arms and the posts are composed of the same material.

In addition, the heights of the posts are independent of the thickness of the infrared ray absorption layer or the support arms, and the thickness of the infrared ray absorption layer is 5,000 to 12,000 Å.

The upper and lower electrodes are composed of a metallic material, which is not transparent in an infrared wavelength band. Additionally, the lower electrode is composed of a metallic material, which is not transparent in an infrared wavelength band, and the upper electrode is composed of an oxide material or a metallic material, which is transparent in an infrared wavelength band.

BRIEF DESCRIPTION OF THE DRAWINGS

The aforementioned aspects and other features of the present invention will be explained in the following description, taken in conjunction with the accompanying drawings, wherein.

DETAILED DESCRIPTION OF PREFERRED EMBODIMENTS

Figure 1:
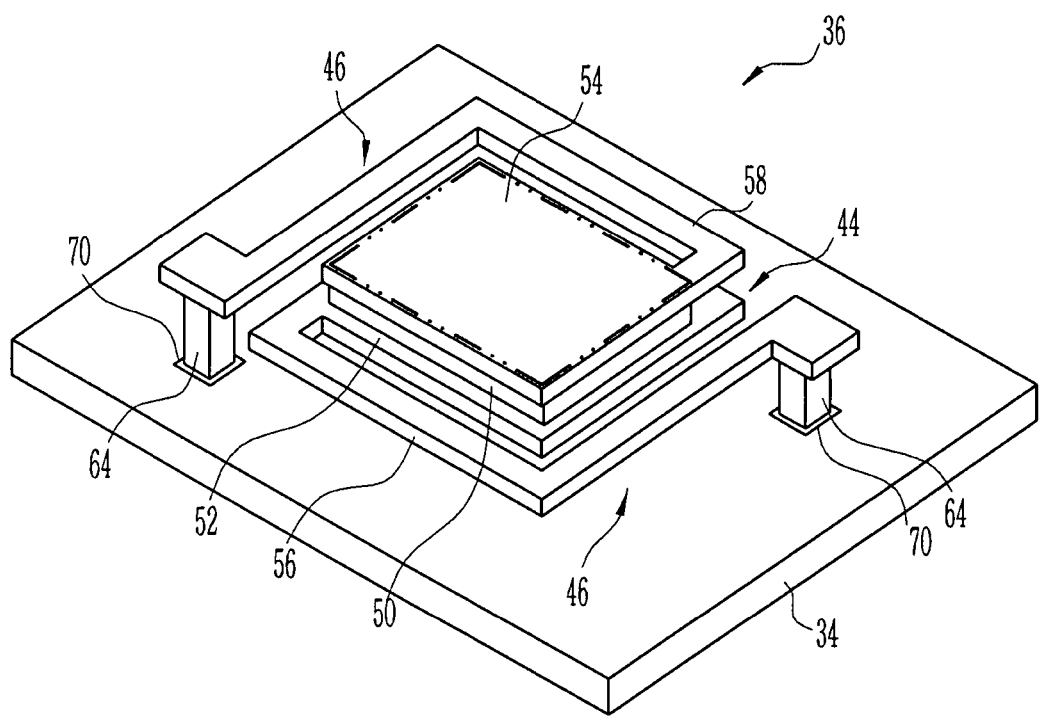
FIG. 1 is a perspective view for explaining an example of a conventional pyroelectric infrared ray sensor.

The present invention will be described in detail by way of a preferred embodiment with reference to accompanying drawings, in which like reference numerals are used to identify the same or similar parts.

Figure 2A:
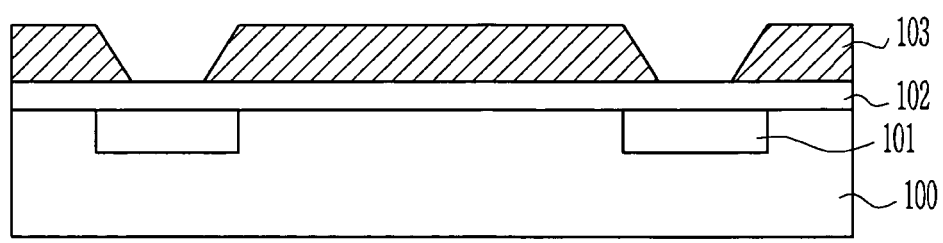
FIGS. 2A to 2F are cross sectional views for explaining a method of fabricating an infrared ray sensor according to a preferred embodiment of the present invention.
Figure 2B:
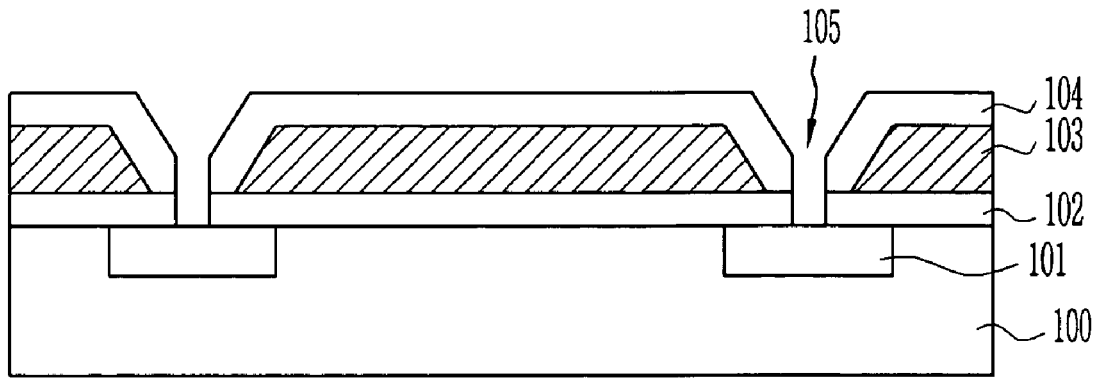
Figure 2C:
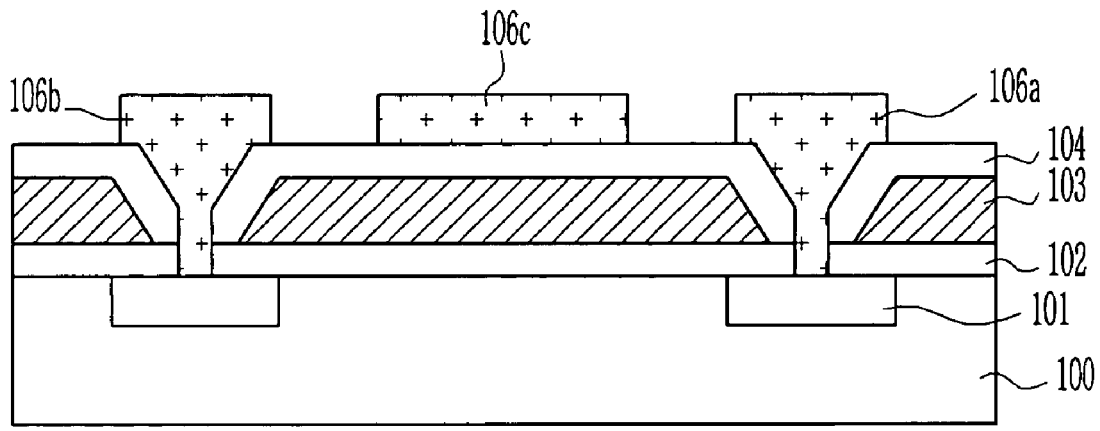
Figure 2D:
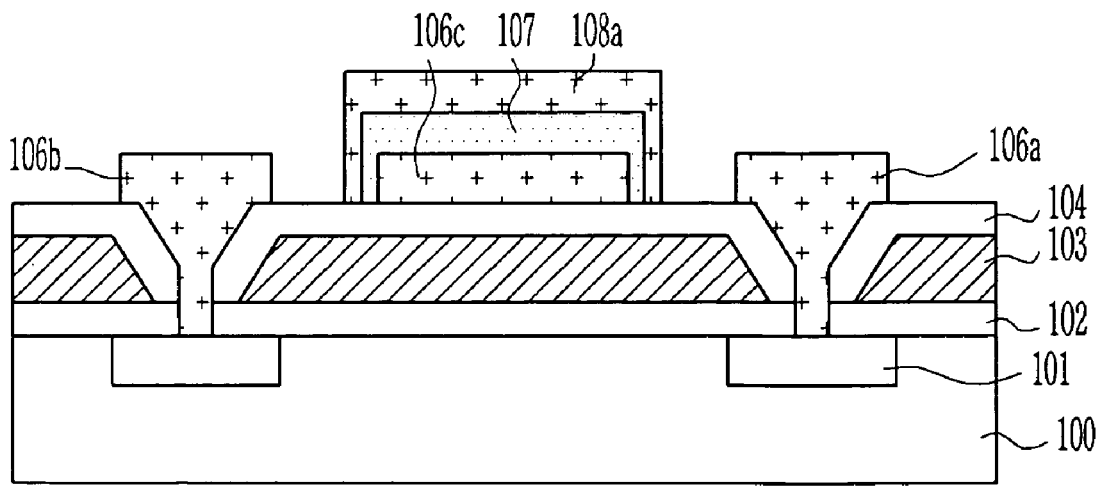
Figure 2E:
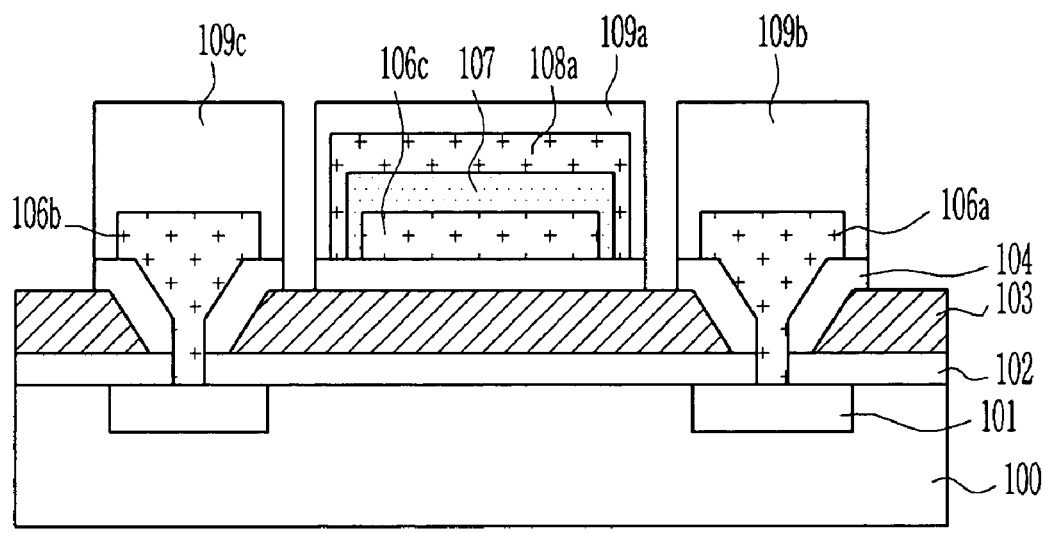
Figure 2F:
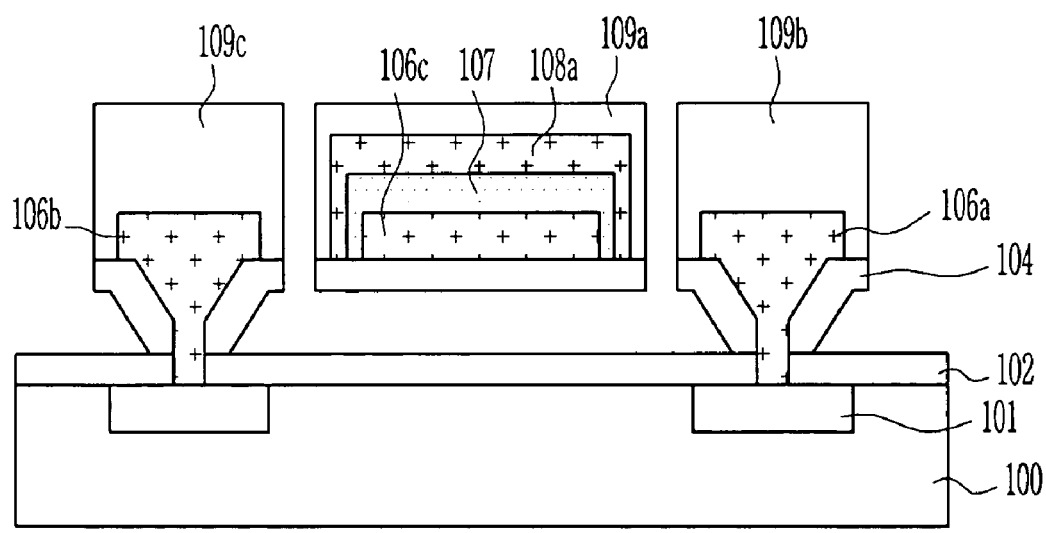
Figure 3:
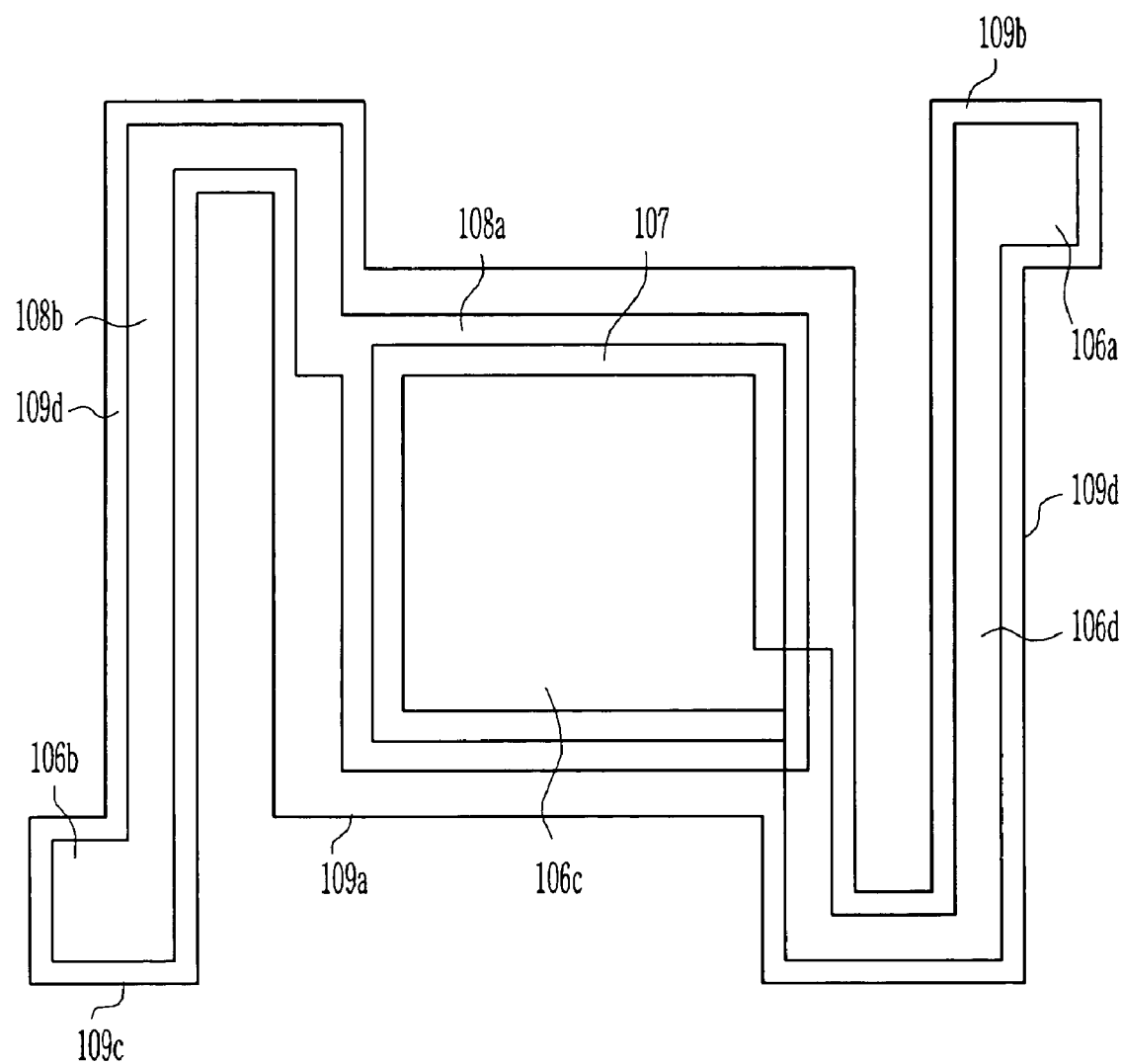
FIG. 3 is a plan view for explaining FIGS. 2C to 2E.

FIGS. 2A to 2F are cross sectional views for explaining a method of fabricating an infrared ray sensor according to a preferred embodiment of the present invention, and FIG. 3 is a plan view for explaining FIGS. 2C to 2E. The figures illustrate schematic cross sectional structures and a plane structure for explaining an embodiment of the present invention.

Referring to FIG. 2A, a protective film 102 and a sacrificial layer 103 are sequentially formed on a substrate 100 in which a predetermined circuitry pattern (not shown) and at least two junctions 101 are formed, and then the sacrificial layer 103 is patterned to expose a part of the protective film 102 on the top portion of the junction 101. The protective film 102 is formed with an oxide film having a thickness of, for example, about 5,000 Å. The sacrificial layer 103 is formed with a poly silicon material or an amorphous silicon material and patterned so that its sidewalls are sloped.

Referring to FIG. 2B, a buffer layer 104 is formed on the whole top surface, and then the buffer layer 104 and the protective film 102 are sequentially patterned to expose predetermined parts of the junctions 101 to form contact holes 105. At this point, the upper portion of each contact hole may be formed to be wider than the lower portion when the sidewalls of the sacrificial layer 103 are formed to be sloped.

Referring to FIG. 2C, a conductive layer is formed on the whole top surface to bury the contact holes 105, and then patterned so that plugs 106a and 106b are formed on the contact holes 105, a lower electrode 106c is formed between the plugs 106a and 106b and a wiring 106d is formed between one of the plugs 106a and 106b and the lower electrode 106c. At this point, the lower electrode 106c formed in a light absorption region is connected to the plug 106a through the wiring 106d as shown in FIG. 3.

The lower electrode 106c is formed with a metallic conductive material, which has an excellent electrical conductivity and is not transparent in an infrared wavelength band. For example, the thin films made of Pt or Ir can be used.

Referring to FIG. 2D, a pyroelectric thin film 107 is formed on the whole top surface and then patterned to remain only on the lower electrode 106c. Subsequently, a conductive layer is formed on the whole top surface again and then patterned so that an upper electrode 108a is formed on the remained pyroelectric thin film 107 and a wiring 108b is formed between the upper electrode 108a and the other plug 106b. At this point, the upper electrode 108a is connected to the other plug 106b through the wiring 108b as shown in FIG. 3. In other words, the pyroelectric thin film 107 surrounds the lower electrode 106c for an electrical insulation, and the upper layer 108a surrounds the pyroelectric thin film 107, so that a sequentially laminated structure of the lower electrode 106c, the pyroelectric thin film 107 and the upper electrode 108a is formed.

The pyroelectric thin film 107 includes $Pb(Zr_{1-x}Ti_x)O_3$ or any pyroelectric material having impurities therein, such as $(Pb_{1-x}La_x)(Zr_{1-y}Ti_y)O_3$, $(Ba_{1-x}Sr_x)TiO_3$, and $(Sr_{1-x}Ba_x)Nb_2O_6$. The upper electrode 108a may be formed with a metallic conductor which is not transparent in an infrared wavelength band, or a thin film formed by using a metallic material or an oxide material which is transparent in an infrared wavelength band, such as lanthanum nickelate (LNO), barium ruthenate (BRO), and strontium ruthenate (SRO).

Referring to FIG. 2E, a silicon oxide ($SiO_2$) film 109 having a thickness of, for example, 500 to 12,000 Å is formed and then patterned so that the infrared ray absorption layer 109a is formed on the upper electrode 108a, the posts 109b and 109c are formed by surrounding the plugs 106a and 106b, and the support arms 109d are formed between the infrared ray absorption layer 109a and the posts 109b and 109c as shown in FIG. 3. At this point, the infrared ray absorption layer 109a and the posts 109b and 109c are connected to each other by the support arms 109d as shown in FIG. 3.

Figure 4A:
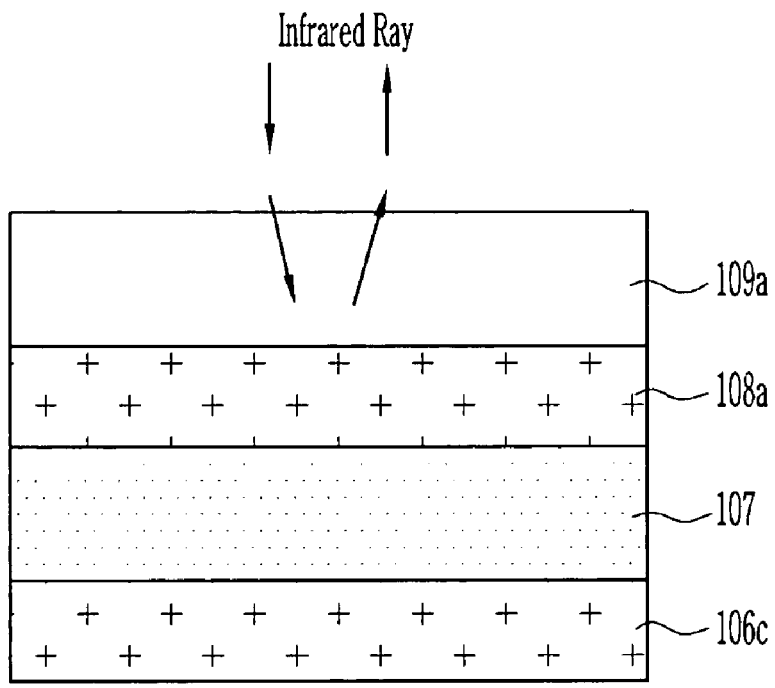
FIGS. 4A and 4B are cross sectional views illustrating infrared ray absorption characteristics based on the transparency of the upper electrode.
Figure 4B:
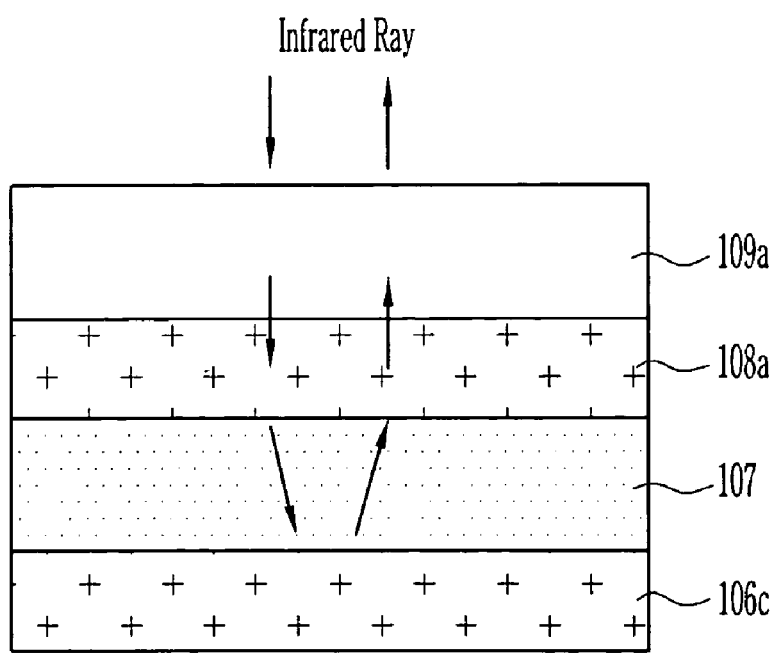

The thickness of the infrared ray absorption layer 109a composed of a silicon oxide ($SiO_2$) film depends upon whether the upper electrode 108a disposed below is transparent in an infrared wavelength band or not. If the upper electrode 108a is not transparent in an infrared wavelength band, the thickness of the infrared ray absorption layer 109a must be larger because the infrared ray is absorbed by only the silicon oxide film ($SiO_2$) as shown in FIG. 4A. If the upper electrode 108a is transparent in an infrared wavelength band, the thickness of the infrared ray absorption layer 109a can be thinner because the optical characteristics of the infrared ray absorption layer 109a, the upper electrode 108a and the pyroelectric thin film 107 influence the absorption of the infrared ray as shown in FIG. 4B. For this reason, the lower electrode 106c is necessary to be formed with one of materials that are not transparent in an infrared wavelength band so that the entire incident infrared ray can be reflected.

Referring to FIG. 2F, the sacrificial layer 103 is completely removed. For example, methods such as a dry etching can be used to completely remove the sacrificial layer 103 exposed between the support arms 109d so that a focal plate assembly in which the lower electrode 106c, the pyroelectric thin film 107, the upper electrode 108a and the infrared ray absorption layer 109a are laminated is separated from the substrate 100 within a predetermined distance, i.e., the thickness of the sacrificial layer 103. At this point, the separated assembly is supported by the support arms 109d connected to the posts 109b and 109c.

Figure 5:
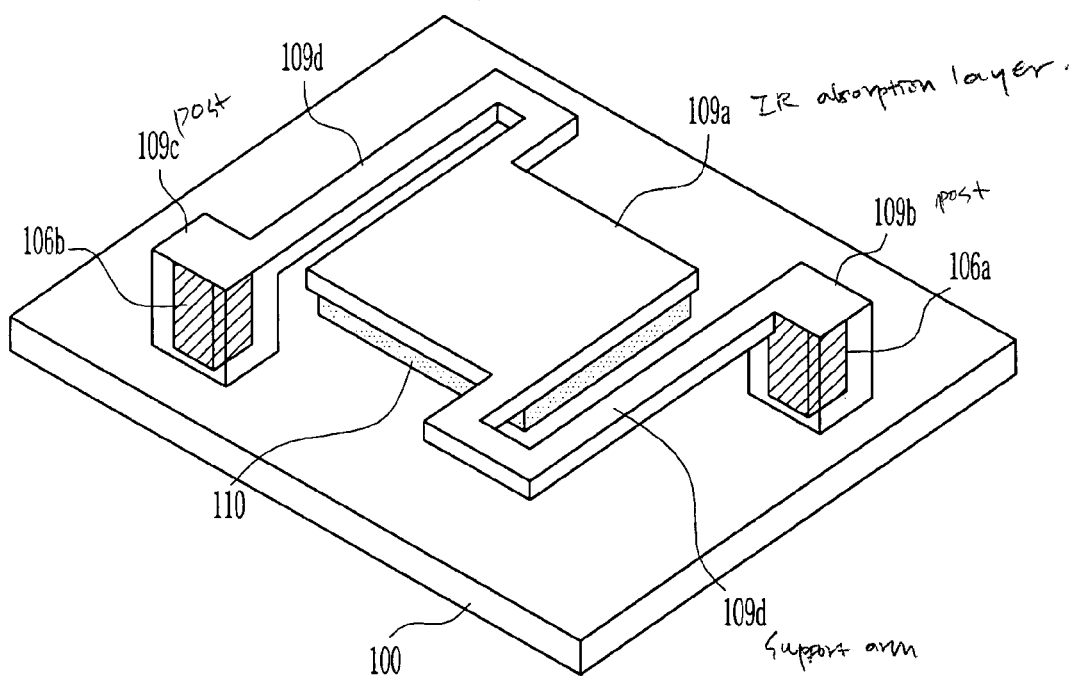
FIG. 5 is a perspective view illustrating a configuration of an infrared ray sensor according to a preferred embodiment of the present invention.
Figure 6:
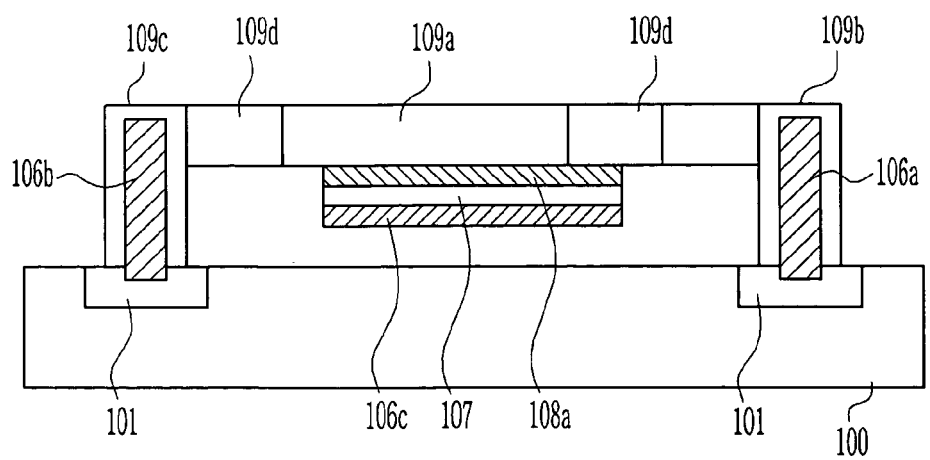
FIG. 6 is a side elevation view illustrating a configuration of an infrared ray sensor according to a preferred embodiment of the present invention.

FIG. 5 is a schematic perspective view and FIG. 6 is a side elevation view, illustrating an infrared ray sensor fabricated according to the above method.

The infrared ray sensor according to the present invention comprises the focal plate 110 in which the lower electrode 106c, the pyroelectric thin film 107, the upper electrode 108a and the infrared ray absorption layer 109a are laminated, the electrodes 106a and 106b each connected to the lower electrode 106c and the upper electrode 108a through the wirings 106d and 108b, and the support means for supporting the focal plate 110 on the substrate 100, wherein the support means comprises the posts 109b and 109c each formed to surround the electrode portions 106a and 106b, and the support arms 109d for connecting the focal plate 110 and the posts 109b and 109c.

More specifically, the plugs 106a and 106b are formed on the junctions 101 on the substrate 100, respectively, and the posts 109b and 109c are formed to surround the plugs 106a and 106b, respectively. In addition, the focal plate 110 in which the lower electrode 106c, the pyroelectric thin film 107, the upper electrode 108a and the infrared ray absorption layer 109a are laminated is formed on the light absorption area on the substrate 100. The focal plate 110 is supported by the support arms 109d connected to the posts 109b and 109c to be separated from the surface of the substrate 100 within a predetermined distance. The lower electrode 106c is connected to the plug 106a formed in one of the posts, for example, 109b via the wiring 106d. The upper electrode 108a is connected to the plug 106b formed in the other post 109c via the wiring 108b.

In the focal plates of the conventional infrared ray sensors, the infrared ray absorption layer and the structural components of the assembly has been separately laminated. On the contrary, the present invention is characterized in that the components are simplified so that the infrared ray absorption layer composed of the silicon oxide film ($SiO_2$) also functions as a structural component for supporting the focal plate assembly. In other words, the infrared ray absorption layer 109a, the support arms 109d for supporting the infrared ray absorption layer 109a, and the posts 109b and 109c for fixing the support arms 109d are formed with a single material as well as integrated in a single body. As a consequence, the infrared ray absorption layer and the structural components can be formed by a single exposure process according to the present invention in comparison with the conventional arts in which several exposure processes have to be prepared to form the infrared ray absorption layer and the structural components, respectively. In addition, the silicon oxide film ($SiO_2$) becomes the most upper layer in the assembly so that it can also function as a protective layer, which protects a finished element.

Figure 7:
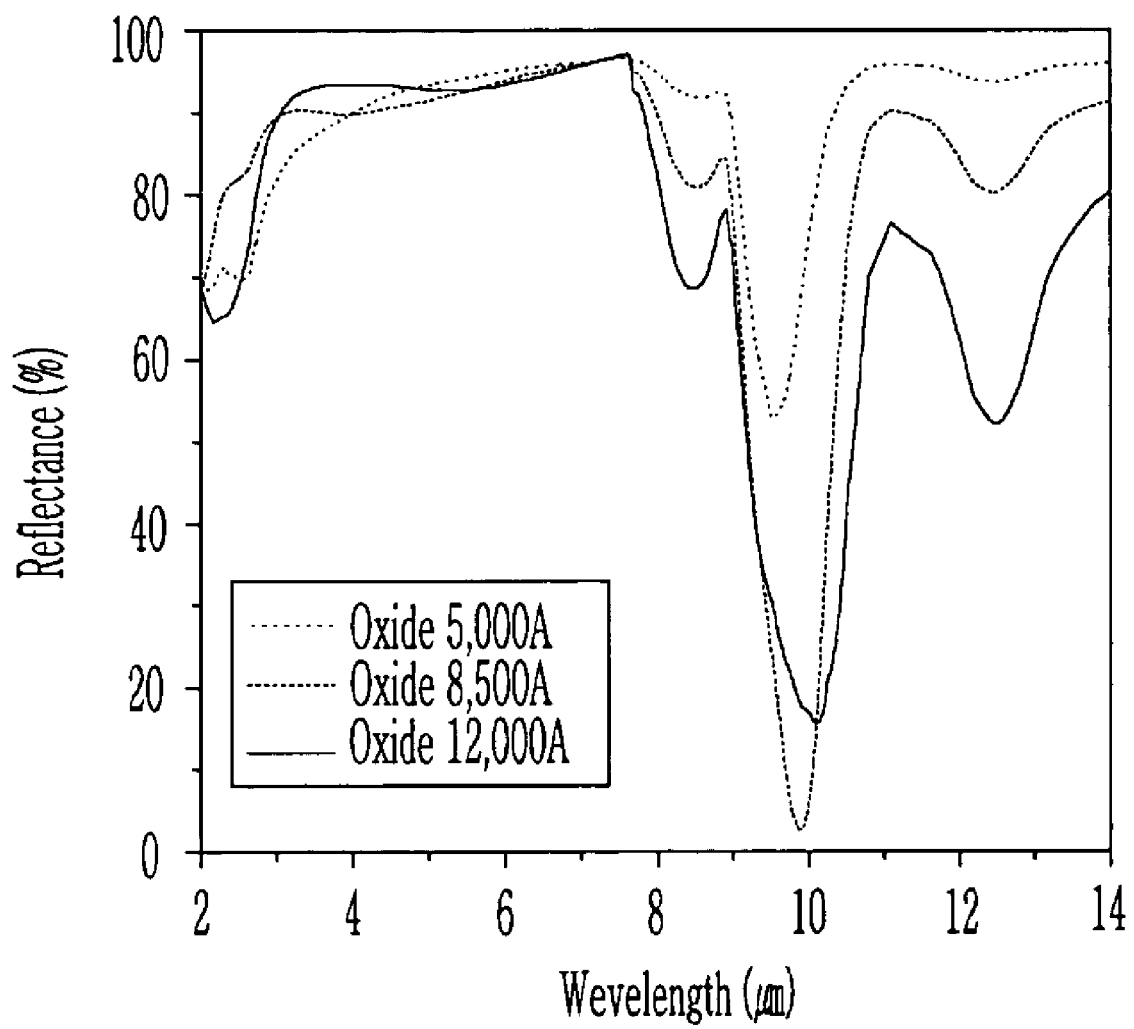
FIGS. 7 and 8 are graphs illustrating the infrared ray absorption characteristics based on the thickness of the silicon oxide film in the infrared ray sensor according to the present invention.
Figure 8:
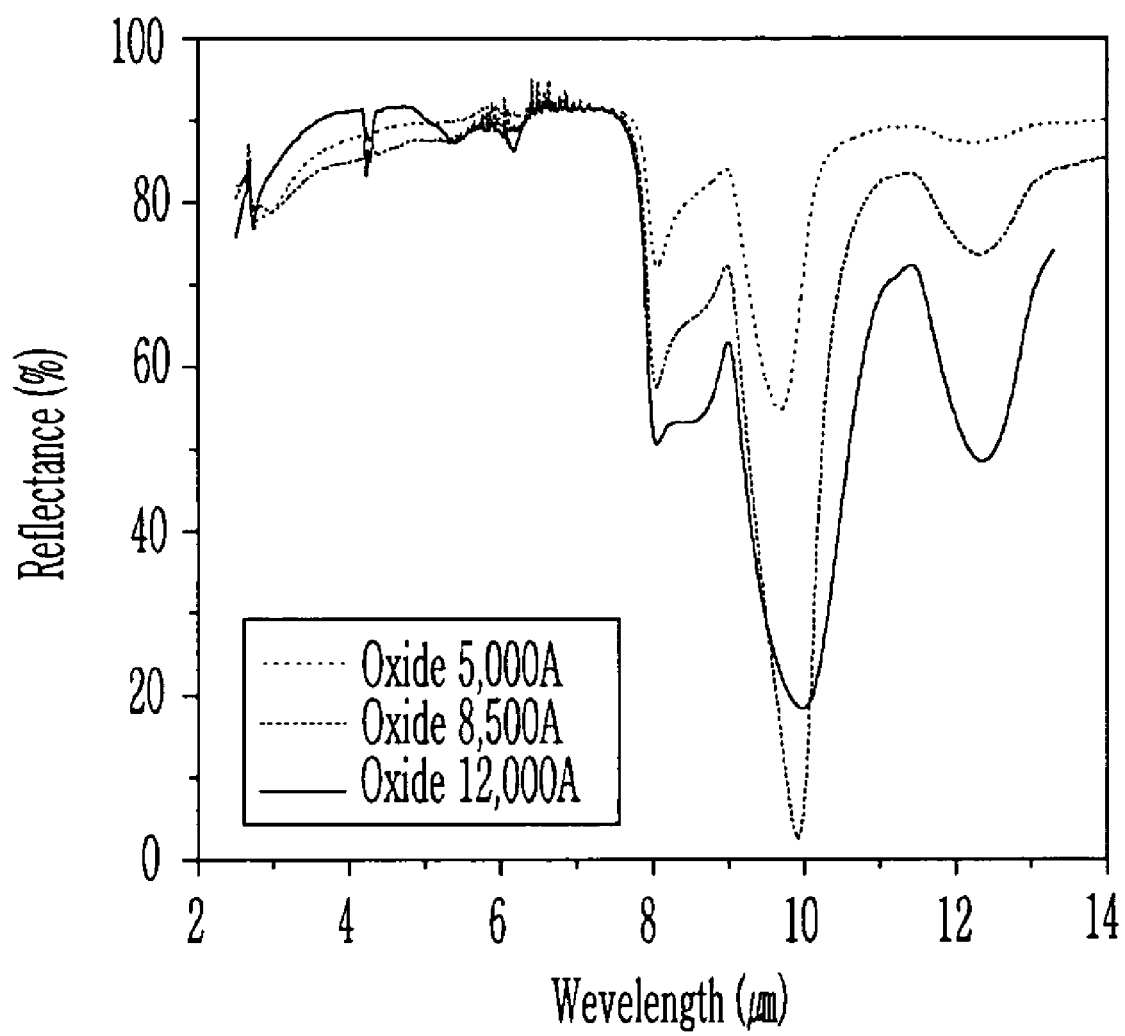

FIGS. 7 and 8 are graphs for measuring the changes of reflectance based on the thicknesses of the silicon oxide films of 5,000 Å, 8500 Å, and 12,000 Å, which show that the infrared absorption capability becomes very excellent in the infrared wavelength band. FIG. 7 shows a simulated result, whereas FIG. 8 shows an experimental result. As recognized in the graphs, it is possible to achieve maximum efficiency when the infrared ray absorption layer 109a is formed with the silicon oxide film having the thickness of 5,000 to 12,000 Å according to the present invention.

According to the present invention, the infrared absorption rate is determined by the optical characteristics represented by the thickness relations of the silicon oxide film constituting the infrared ray absorption layer 109a, the oxide film constituting the upper electrode 108a and the pyroelectric thin film 107. In this occasion, the thermal mass of the focal plate having a three-dimensionally separated structure can be minimized by properly adjusting the thicknesses of the above three films. Therefore, according to the present invention, it is possible to implement a focal plate configuration having a small thermal mass. Furthermore, it is possible to increase the safety of the structural components as well as fabricate elements with a constant reproducibility.

As described above, according to the present invention, the infrared ray absorption layer, the support arms and the posts are integrated in a single body by using a silicon oxide film ($SiO_2$) in comparison with the conventional infrared ray sensors. The infrared ray absorption layer composed of the silicon oxide film increases infrared absorption capability in the 8 to 12 mm wavelength band and functions as a protective film for a sensor pixel. In addition, the structure integrated in a single body allows the structural components of the sensor to be robust, the fabricating processes to be remarkably reduced and thus a process yield to be increased. Furthermore, it is possible to achieve a high yield with a low cost by reducing the number of the masks required in the fabricating processes.

The present invention has been described with reference to a particular embodiment in connection with a particular application. Those having ordinary skill in the art and access to the teachings of the present invention will recognize additional modifications and applications within the scope thereof.

It is therefore intended by the appended claims to cover any and all such applications, modifications, and embodiments within the scope of the present invention.

What is claimed is:

1. An infrared ray sensor, comprising:
   a focal plate for detecting an incident infrared ray, in which a lower electrode, a pyroelectric thin film, an upper electrode and an infrared ray absorption layer are formed in sequence and laminated;
   electrodes connected to the upper electrode and the lower electrode via wirings, respectively; and
   a support means for supporting the focal plate on a substrate, wherein the infrared ray absorption layer is composed of a silicon oxide film with a predetermined thickness, wherein the focal plate is separated from the substrate and supported by support arms.

2. The infrared ray sensor according to claim 1, wherein the support means is composed of a silicon oxide film.

3. The infrared ray sensor according to claim 1, wherein the electrodes are formed in a plug shape and connected to junctions formed on the substrate.

4. The infrared ray sensor according to claim 1, wherein the support means includes:
   posts surrounding the electrodes having a plug shape and connected to junctions formed on the substrate; and
   the support arms connecting the posts to the focal plate.

5. The infrared ray sensor according to claim 4, wherein the infrared ray absorption layer, the support arms and the posts are composed of the same material.

6. The infrared ray sensor according to claim 5, wherein the heights of the posts are independent of the thickness of the infrared ray absorption layer or the support arms.

7. The infrared ray sensor according to claim 1, wherein the thickness of the infrared ray absorption layer is 5,000 to 12,000 Å.

8. The infrared ray sensor according to claim 1, wherein the upper and lower electrodes are composed of a metallic material, which is not transparent in an infrared wavelength band.

9. The infrared ray sensor according to claim 1, wherein the lower electrode is composed of a metallic material which is not transparent in an infrared wavelength band and the upper electrode is composed of an oxide material or a metallic material which is transparent in an infrared wavelength band.

10. The infrared ray sensor according to claim 9, wherein the oxide material includes LNO, BRO or SRO.

11. A method of fabricating an infrared ray sensor, comprising the steps of:
   forming a protective film and a sacrificial layer on a substrate having a plurality of junctions and then patterning the sacrificial layer to expose the protective film formed on top portions of the junctions;
   forming a buffer layer on the whole top surface and then patterning the buffer layer and the protective film to form contact holes thereby exposing the junctions;
   forming plugs on the contact holes and a lower electrode connected to one of the plugs via a wiring on the buffer layer between the plugs;
   forming a pyroelectric thin film on the lower electrode;
   forming an upper electrode connected to the other plug via a wiring on the pyroelectric thin film;
   forming a silicon oxide film on the whole top surface and then patterning the silicon oxide film so that an infrared ray absorption layer is formed on the upper electrode, posts are formed by surrounding the plugs, and support arms are formed between the infrared ray absorption layer and the posts, respectively; and
   removing the sacrificial layer.

12. The method of fabricating an infrared ray sensor according to claim 11, wherein the infrared ray absorption layer has a thickness in the range of 5,000 Å to 12,000 Å.

13. The method of fabricating an infrared ray sensor according to claim 11, wherein the sacrificial layer is formed with a poly silicon or amorphous silicon and patterned so that its sidewalls are sloped.

14. The method of fabricating an infrared ray sensor according to claim 11, wherein the upper and the lower electrodes are formed with a metallic material, which is not transparent in an infrared wavelength band.

15. The method of fabricating an infrared ray sensor according to claim 11, wherein the lower electrode is formed with a metallic material which is not transparent in an infrared wavelength band and the upper electrode is formed with an oxide material or a metallic material which is transparent in an infrared wavelength band.

* * * * *